(12) United States Patent
Xie et al.

(10) Patent No.: US 8,403,624 B2
(45) Date of Patent: Mar. 26, 2013

(54) COMPOSITE CONTAINMENT CASINGS HAVING AN INTEGRAL FRAGMENT CATCHER

(75) Inventors: Ming Xie, Beavercreek, OH (US); Donald George Lachapelle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1229 days.

(21) Appl. No.: 12/059,120

(22) Filed: Mar. 31, 2008

(65) Prior Publication Data
US 2009/0155044 A1 Jun. 18, 2009

Related U.S. Application Data

(63) Continuation-in-part of application No. 11/954,896, filed on Dec. 12, 2007, and a continuation-in-part of application No. 11/954,878, filed on Dec. 12, 2007, now Pat. No. 8,061,966, and a continuation-in-part of application No. 11/954,844, filed on Dec. 12, 2007, now Pat. No. 8,046,915.

(51) Int. Cl.
*F01D 25/24* (2006.01)

(52) U.S. Cl. ... 415/9; 415/173.1; 415/173.4; 415/174.4; 415/220

(58) Field of Classification Search ........... 415/9, 173.1, 415/173.4, 174.4, 220
See application file for complete search history.

(56) References Cited

U.S. PATENT DOCUMENTS

| | | |
|---|---|---|
| 3,053,694 A | 9/1962 | Daunt et al. |
| 4,149,824 A | 4/1979 | Adamson |
| 4,411,589 A | 10/1983 | Joubert et al. |
| 4,452,565 A | 6/1984 | Monhardt et al. |
| 4,500,252 A | 2/1985 | Monhardt et al. |
| 4,517,038 A | 5/1985 | Miller |
| 4,598,449 A | 7/1986 | Monhardt et al. |
| 4,699,567 A | 10/1987 | Stewart |
| 4,793,879 A | 12/1988 | Mimbs |
| 4,808,253 A | 2/1989 | Mimbs |
| 4,824,500 A | 4/1989 | White et al. |
| 4,910,065 A | 3/1990 | McKinney |
| 4,914,794 A | 4/1990 | Strangman |
| 4,916,880 A | 4/1990 | Westerman, Jr. |
| 4,961,685 A | 10/1990 | Neubert |
| 5,160,248 A | 11/1992 | Clarke |
| 5,344,280 A | 9/1994 | Langenbrunner |
| 5,431,532 A | 7/1995 | Humke |
| 5,451,448 A | 9/1995 | Sawko |
| 5,486,086 A | 1/1996 | Bellia |
| 5,618,606 A | 4/1997 | Sherrick et al. |
| 5,624,622 A | 4/1997 | Boyce |
| 5,897,739 A | 4/1999 | Forster et al. |
| 6,049,978 A | 4/2000 | Arnold |
| 6,053,696 A * | 4/2000 | Roberts .................... 415/9 |
| 6,059,524 A | 5/2000 | Costa |
| 6,149,749 A | 11/2000 | McBroom |
| 6,180,206 B1 | 1/2001 | Kain, Jr. |
| 6,206,067 B1 | 3/2001 | Kociemba et al. |
| 6,290,455 B1 | 9/2001 | Hemmelgarn et al. |
| 6,355,203 B1 | 3/2002 | Charmes et al. |
| 6,468,372 B2 | 10/2002 | Kociemba et al. |

(Continued)

OTHER PUBLICATIONS

European Search Report dated Nov. 19, 2012 for corresponding Application No. 08170596.4-1267/2071137.

(Continued)

*Primary Examiner* — Ninh H Nguyen
(74) *Attorney, Agent, or Firm* — General Electric Company; William Scott Andes; David J. Clement

(57) ABSTRACT

Composite containment casings including a body having an interior and a fragment catcher integrally joined to the interior of the body of the containment casing.

3 Claims, 7 Drawing Sheets

U.S. PATENT DOCUMENTS

| | | |
|---|---|---|
| 6,510,961 B1 | 1/2003 | Head et al. |
| 6,551,441 B1 | 4/2003 | Sato et al. |
| 6,740,381 B2 | 5/2004 | Day |
| 6,742,547 B2 | 6/2004 | Bryn |
| 6,758,924 B1 | 7/2004 | Guijt |
| 6,761,783 B2 | 7/2004 | Keller et al. |
| 6,770,349 B2 | 8/2004 | Itoh et al. |
| 6,814,541 B2 * | 11/2004 | Evans et al. .................... 415/200 |
| 6,820,334 B2 | 11/2004 | Kebbede et al. |
| 6,852,192 B2 | 2/2005 | Sato et al. |
| 6,892,766 B2 | 5/2005 | Bryn |
| 6,913,436 B2 | 7/2005 | McMillan |
| 7,125,217 B2 * | 10/2006 | Care ................................. 415/9 |
| 7,185,432 B2 | 3/2007 | Swaffar |
| 7,255,528 B2 | 8/2007 | Stretton |
| 7,278,208 B2 | 10/2007 | Le Saint et al. |
| 7,335,012 B2 | 2/2008 | Blanton et al. |
| 7,402,022 B2 * | 7/2008 | Harper et al. ..................... 415/9 |
| 7,419,556 B2 | 9/2008 | Holland |
| 7,503,164 B2 | 3/2009 | McMillan |
| 7,572,347 B2 | 8/2009 | Bogue |
| 7,914,251 B2 * | 3/2011 | Pool et al. ......................... 415/9 |
| 7,935,205 B2 | 5/2011 | Bogue et al. |
| 7,959,405 B2 * | 6/2011 | Launders ......................... 415/9 |
| 8,108,979 B2 | 2/2012 | Stadtlander et al. |
| 2005/0074593 A1 | 4/2005 | Day et al. |
| 2006/0059828 A1 | 3/2006 | Stevenson et al. |
| 2006/0260293 A1 | 11/2006 | Launders |
| 2007/0275212 A1 | 11/2007 | Stadtlander et al. |
| 2008/0233346 A1 | 9/2008 | Bogue et al. |

OTHER PUBLICATIONS

Baker, A.A., "Repair Techniques for Composite Structures", Composite Materials in Aircraft Structures, Jan. 1, 1990, pp. 207-227, Longman, New York.

* cited by examiner

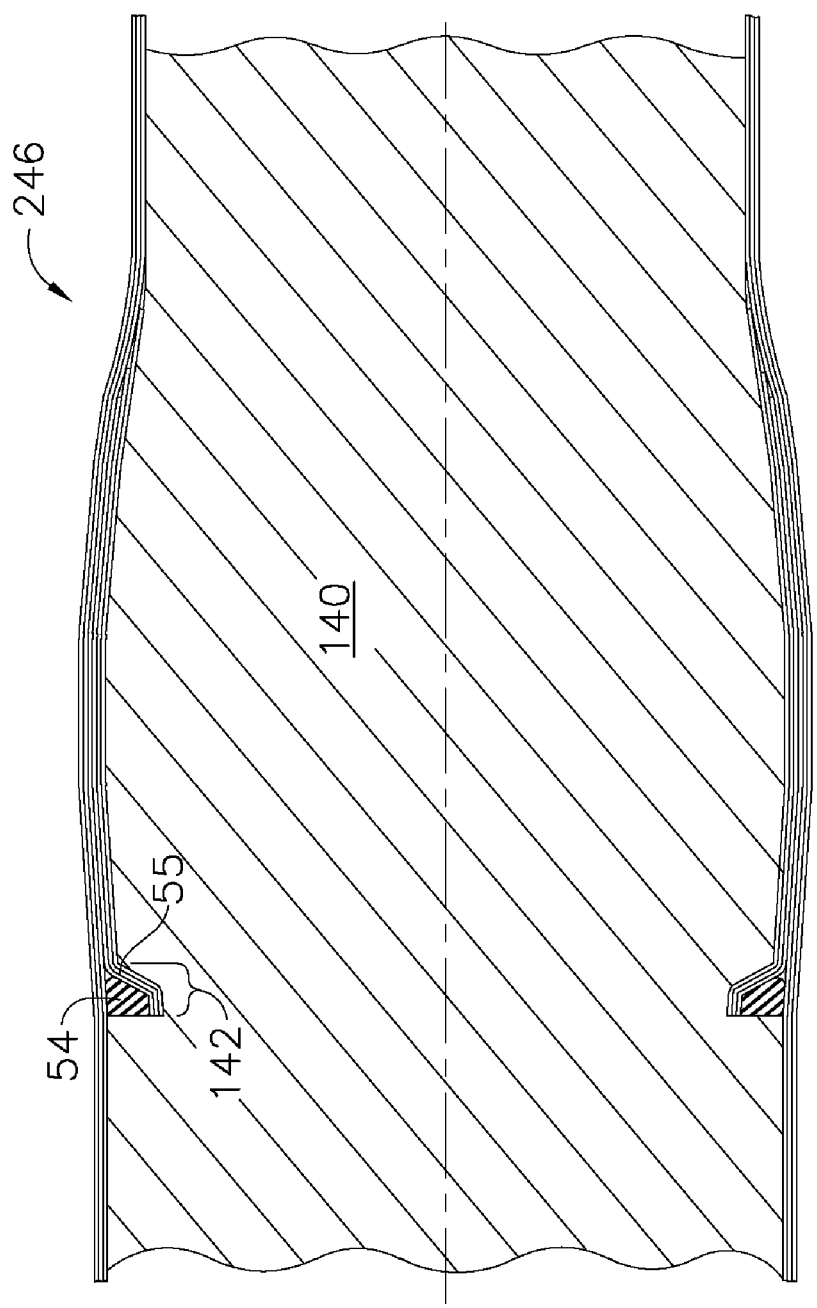

COMPOSITE CONTAINMENT CASINGS HAVING AN INTEGRAL FRAGMENT CATCHER

CROSS REFERENCE TO RELATED APPLICATIONS

This is a Continuation-in-Part of application Ser. Nos. 11/954,844, now U.S. Pat. No. 8,046,915 11/954,878, now U.S. Pat. No. 8,061,966 and 11/954,896, all filed on Dec. 12, 2007, all of which are herein incorporated by reference in their entirety.

TECHNICAL FIELD

Embodiments described herein generally relate to composite containment casings having an integral fragment catcher. More specifically, embodiments herein generally describe composite fan casings for gas turbine engines having an integral fragment catcher.

BACKGROUND OF THE INVENTION

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine which in turn spins the shaft and provides power to the compressor. The hot exhaust gases are further expanded through nozzles at the back of the engine, generating powerful thrust, which drives the aircraft forward.

Because engines operate in a variety of conditions, foreign objects may undesirably enter the engine. More specifically, foreign objects, such as large birds, hailstones, ice, sand and rain may be entrained in the inlet of the engine where they may impact the engine or a fan blade therein. Sometimes these impacts can result in a portion of the contacted blade being torn loose from the rotor, which is commonly known as fan blade out. The loose fan blade may then impact the interior of the fan casing. Similarly, in cold weather and at high altitudes, ice can form and accumulate on the fan blades. When engine speed is rapidly accelerated, or altitude is decreased, the ice can shed, also resulting in an impact with the interior of the fan casing.

In recent years composite materials have become increasingly popular for use in a variety of aerospace applications because of their durability and relative lightweight. Although composite materials can provide superior strength and weight properties, and can lessen the extent of damage to the fan casing during impacts such as ice shedding and fan blade outs, there remains room for improvement.

Current composite containment technology, such as that used to make fan casings, typically employs a thick, monolithic hardwall design that is capable of withstanding an impact caused by ice and/or released fan blades, and also fragmentizing the ice or released fan blades, breaking them into smaller pieces. These fragmentized pieces can then be purged from the engine without causing significant damage to either the engine or the body of the aircraft. The construction of the fan casing provides for the dissipation of impact energy using any of a number of mechanisms including fiber/matrix interference failure, matrix microcracking and ply delamination.

More specifically, current hardwall designs generally consist of an abradable system having an abradable layer attached to a substrate structure that includes a glass/epoxy composite face sheet bonded to a Nomex® honeycomb core, which can be very lightweight. See U.S. Pat. No. 5,344,280 to Langenbrunner et al. However, such honeycomb cores are typically not designed to provide significant energy absorption during a fan blade out event. More specifically, the design of the honeycomb core results in an abradable system having radial weakness. Thus, released fan blades will have a tendency to simply cut through the honeycomb core upon impact, leaving roughly 99% of the impact energy to be absorbed by the fan casing body. Moreover, because the current abradable systems require numerous layup, bonding, cure, and machining cycles, the fabrication of such systems can be labor intensive, costly, and can result in a heavier than desired fan casing because of the multiple layers of construction. Additionally, because the abradable system is fabricated separately from, and then attached to, the fan casing, the two parts function independently, rather than as a unitary system.

Moreover, even if the current composite fan casing design successfully absorbs the impact of the released fan blade and shatters the released blade into smaller fragments as intended, there can still be issues. In particular, as the fan blade fragments are thrown about inside of the fan casing, they can move with such force that there is potential for the fragments to be forcefully thrown from the engine through the inlet. Once ejected from the engine, there is a risk that the blade fragments could be thrown toward the passenger compartment or other key aircraft components, causing severe damage.

Accordingly, there remains a need for composite containment casings having a mechanism for capturing released fan blade fragments to significantly reduce the likelihood of severe damage to the aircraft resulting from the impact thereof.

BRIEF DESCRIPTION OF THE INVENTION

Embodiments described herein generally relate to composite containment casings comprising a body having an interior; and a fragment catcher integrally joined to the interior of the body of the containment casing.

Embodiments herein also generally relate to composite containment casings comprising a body having an interior; a fragment catcher integrally joined to the interior of the body of the containment casing; an abradable system integrally joined to the interior of the body of the containment casing such that the fragment catcher is positioned in a forward orientation in the containment casing with respect to the abradable system, the abradable system comprising a sandwich structure including a first facesheet and a second facesheet position about at least one core layer; and at least one abradable layer applied to the sandwich structure wherein the at least one core layer comprises any of a cell configuration, a columnar configuration, or a truss configuration and wherein the sandwich structure is strong radially and weak circumferentially.

Embodiments herein also generally relate to gas turbine engine fan assemblies comprising a composite containment casing having a body having an interior; a fragment catcher integrally joined to the interior of the body of the containment casing, an abradable system integrally joined to the interior of the body of the containment casing such that the fragment catcher is positioned in a forward orientation in the containment casing with respect to the abradable system, the abradable system comprising a sandwich structure including a first facesheet and a second facesheet position about at least one core layer; and at least one abradable layer applied to the sandwich structure wherein the at least one core layer comprises any of a cell configuration, a columnar configuration, or a truss configuration and wherein the sandwich structure is strong radially and weak circumferentially.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

FIG. 8 is an alternate schematic cross-sectional view of a portion of a mandrel having a fragment catcher in the pocket and material wrapped thereabout in accordance with description herein.

DETAILED DESCRIPTION OF THE INVENTION

Embodiments described herein generally relate to composite containment casings having an integral fragment catcher. Those skilled in the art will understand that the following description is applicable to all types of composite gas turbine engines, including but not limited to Low Bypass Fan Engines, High Bypass Fan Engines and Ultra-High Bypass Fan Engines.

Figure 1:
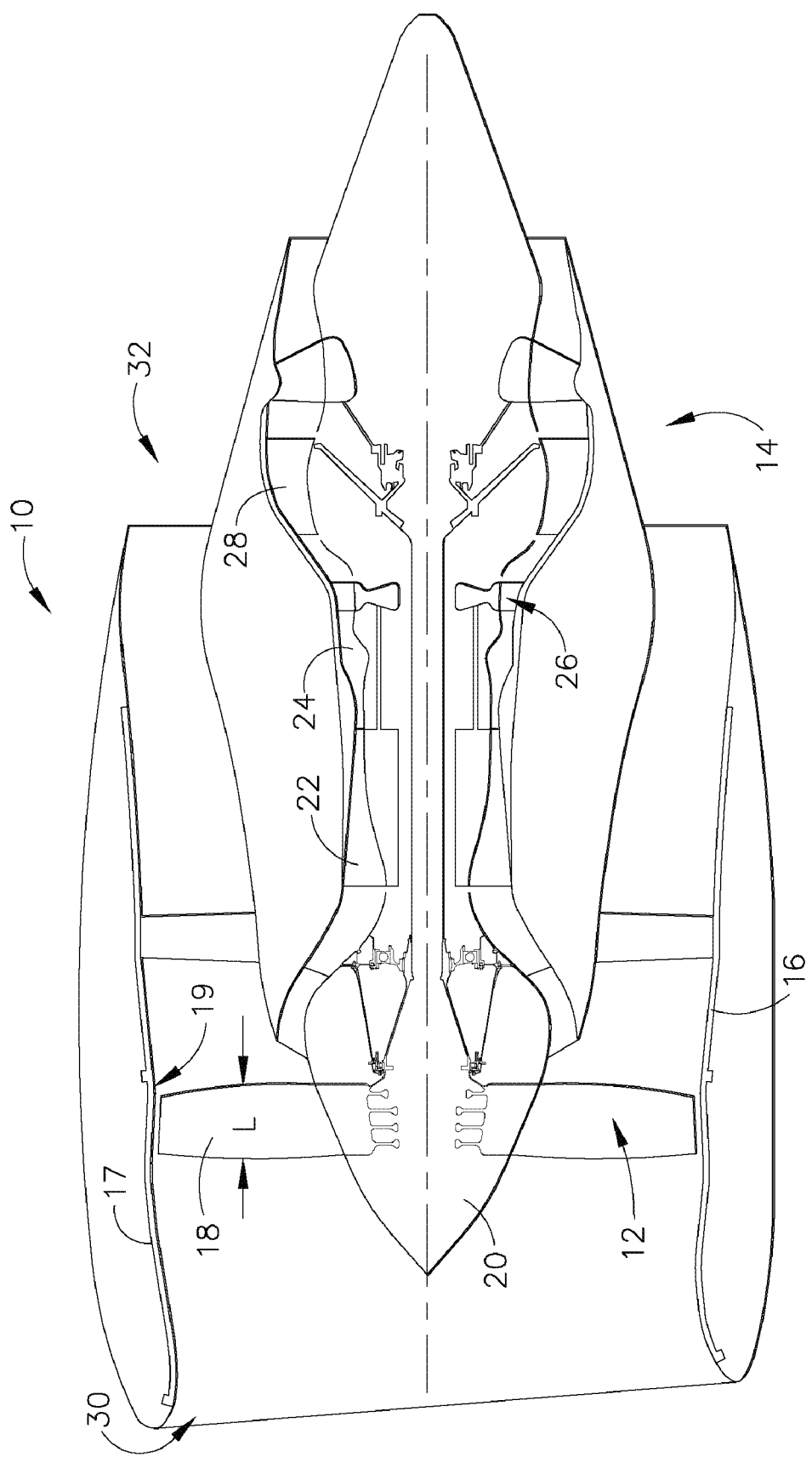
FIG. 1 is a schematic cross-sectional view of one embodiment of a gas turbine engine in accordance with the description herein.

Turning to the figures, FIG. 1 is a schematic representation of one embodiment of a conventional gas turbine engine 10 that generally includes a fan assembly 12 and a core engine 14. Fan assembly 12 may include a composite fan casing 16 having a body 17, and an array of fan blades 18 extending radially outwardly from a rotor disc 20. Core engine 14 may include a high-pressure compressor 22, a combustor 24, a high-pressure turbine 26 and a low-pressure turbine 28. Engine 10 has an intake end 30 and an exhaust end 32.

Figure 2:
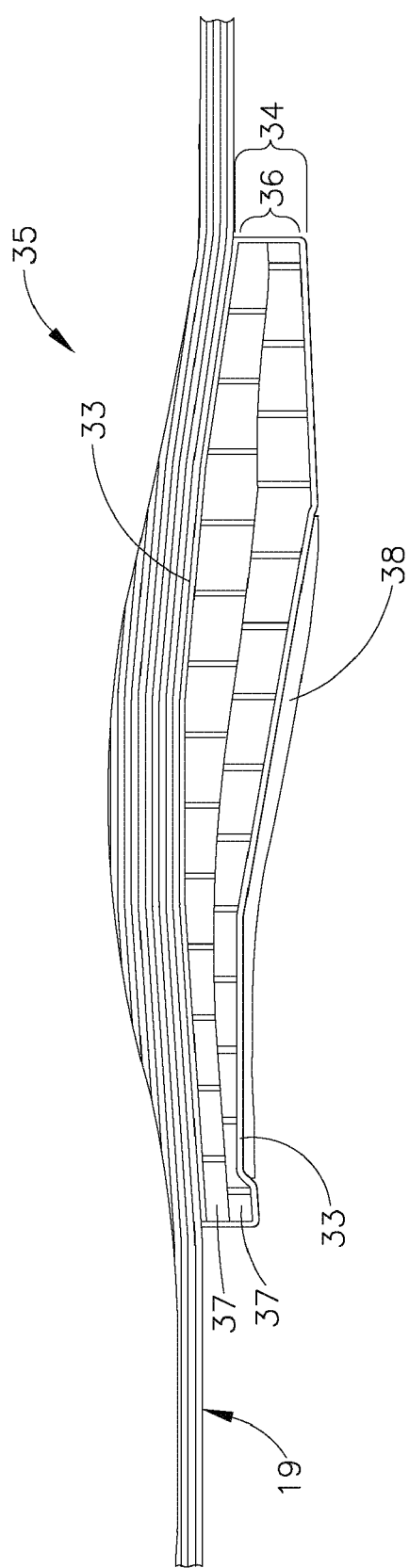
FIG. 2 is a schematic cross-sectional view of a portion of one embodiment of a fan casing having an integrated abradable system in accordance with the description herein.

As previously described, embodiments herein may comprise a fan casing having an integrated abradable system 35 adjoined thereto that can lessen the damage resulting from a fan blade out or other like event. While the abradable system 34 may take a variety of configurations, it may generally comprise a sandwich structure 36 and at least one abradable layer 38, as shown in FIG. 2. As used herein, "sandwich structure" refers to a multi-layered structure generally comprising a first facesheet 33, and a second facesheet 33 positioned about at least one core layer 37, as shown in FIG. 2. First and second facesheet 33, as well as core layer 37, may comprise any woven, braided, or non-crimp fabric capable of being infused with a resin and cured to produce a composite material, such as carbon fibers, graphite fibers, glass fibers, ceramic fibers, and aramid polymer fiber. Moreover, the material used in core layer 37 can have non-isotropic properties, and may include cell, columnar, and truss configurations. A plurality of core layers 37 may be desirable to permit tailoring of the orthotopic properties of sandwich structure 36 as a function of the fan casing radius or thickness.

Figure 3:
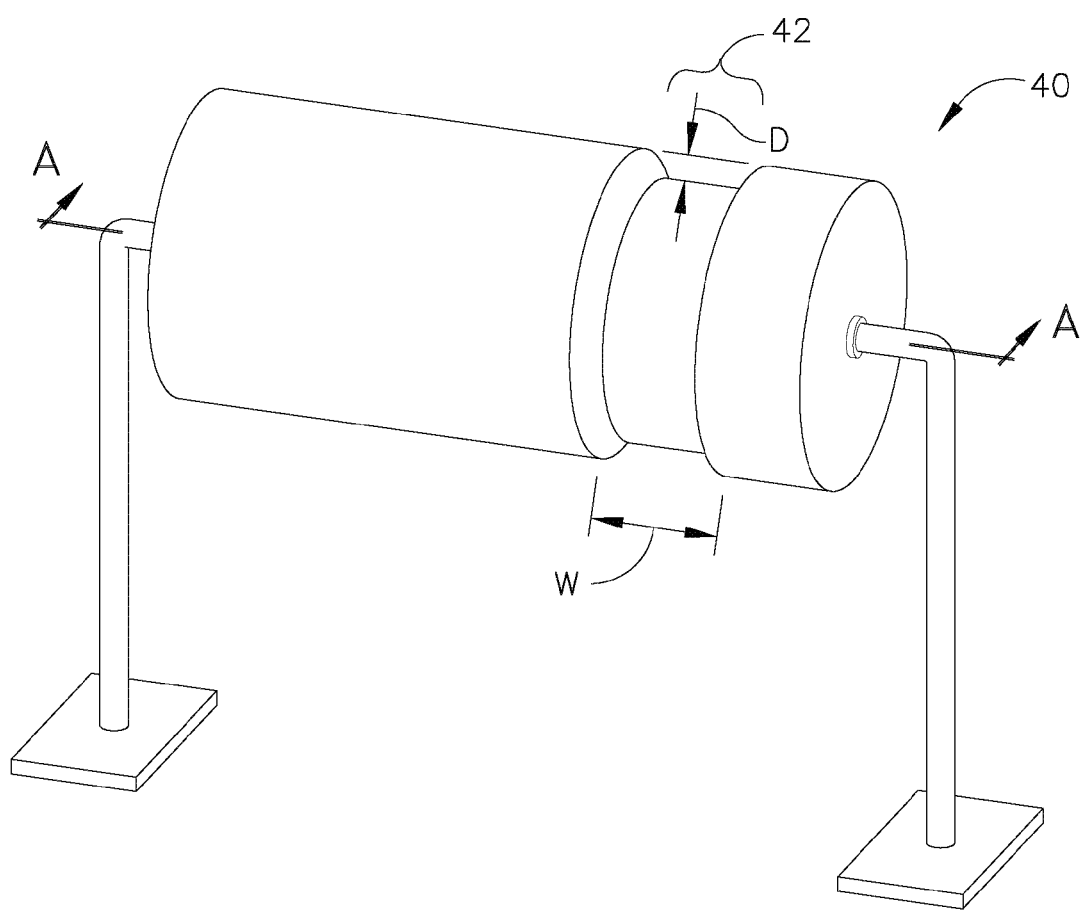
FIG. 3 is a schematic perspective view of one embodiment of a mandrel having a pocket in accordance with the description herein.

Some examples of materials suitable for use as sandwich structure 36 can include, but should not be limited to, TYCOR® (WebCore Technologies, Inc., Miamisburg, Ohio, see U.S. Patent Application 2005/0074593) shown in FIG. 2, or 3-D woven truss configurations (Bally Ribbon Mills, Bally, Pa., see U.S. Pat. Nos. 6,742,547 and 6,892,766) shown in FIGS. 4 and 5.

It is envisioned that during the fabrication process, sandwich structure 36 can be designed to be strong radially and weak circumferentially. Radial strength will allow for the absorption and dissipation of impact energy generated by a released fan blade, as well as the alteration of the released blade's flight trajectory. Circumferential weakness will allow for sandwich structure 36 to become crushed and deformed when impacted by a fan blade due to unbalanced rotor orbiting. Taken together, this radial strength and circumferential weakness can allow the sandwich structure 36 to help absorb energy generated by a released fan blade, thereby reducing the energy that will need to be absorbed by the fan casing. This can lead to the fabrication of a thinner, lighter fan casing. Additionally, sandwich structure 36 can maintain its mechanical integrity, thereby reducing the likelihood the released fan blade will contact and/or significantly damage the fan casing.

Abradable layer 38 refers to the radially innermost layer of integrated abradable system 34 and provides a region against which the fan blades may occasionally rub throughout engine operation. Abradable layer 38 may generally comprise any low-density, syntactic film epoxy suitable for use in a clearance control application that can be resistant to damage from ice impact and can be easily repaired/replaced throughout the service life time of the fan casing, as explained herein below. One example of a suitable material for use as abradable layer 38 is Hysol® EA 9890, though the embodiments herein should not be limited to such. Additionally, abradable layer 38 can be bonded to the fan casing so as to cover sandwich structure 36. Any conventional bonding materials and techniques known to those skilled in the art may are acceptable for use herein.

In general, a fan casing having an integrated abradable system 35 can be made using conventional composite manufacturing processes. However, some modifications to the tooling used in the process are required. As shown in FIG. 3, a mandrel 40 may be provided for fabricating embodiments of the fan casing described herein. Mandrel 40 may be similar to conventional tools used in fan casing fabrication, see for example, U.S. Patent Application No. 2006/0134251 to Blanton et al., with the exception that mandrel 40 can have a pocket 42 disposed circumferentially thereabout for receiving truss core layer 36 of abradable system 34. Mandrel 40 can be "substantially cylindrical," and may be generally shaped like a cylinder, either with or without a contour.

Figure 5:
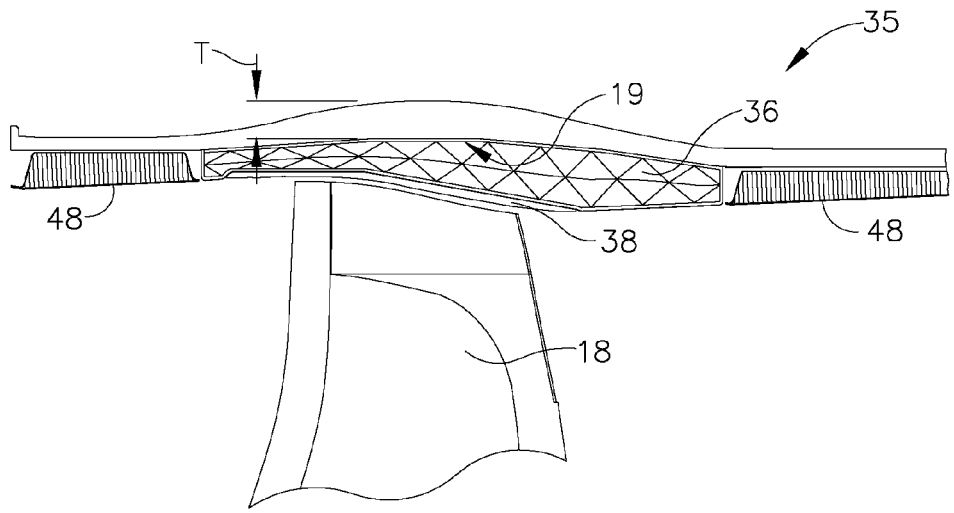
FIG. 5 is a schematic cross-sectional view of a portion of one embodiment of a fan casing having an integrated abradable system and the system's position relative to a fan blade in accordance with the description herein.

More specifically, and as shown in FIG. 3, pocket 42 may have any dimension that corresponds to the desired dimensions of sandwich structure 36 of abradable system 34. However, in general, pocket 42 (and therefore sandwich structure 36) can have a width W of from about one to about three times the axial chord length L of fan blade 18 as indicated in FIG. 1, and a depth D of from about one to about five times the radial thickness T of fan casing. "Radial thickness" is measured at the thickest cross-section of the fan casing, as shown in FIG. 5. As an example, if fan blade 18 comprises an axial chord length L of about 12 inches (about 30.4 cm) and fan casing preform 46 comprises a radial thickness T of about 1 inch (about 2.54 cm), then pocket 42 may have a width W of from about 12 inches (about 30.4 cm) to about 36 inches (about 91.4 cm) and a depth D of from about 1 inch (about 2.54 cm) to about 5 inches (about 12.7 cm). Moreover, because abradable system 34 functions to absorb impact from a released fan blade, pocket 42 can be positioned along mandrel 40 such that sandwich structure 36, and therefore abradable system 34, will be adjacent to fan blades 18 when the fan assembly of the engine is assembled, as shown in FIG. 5.

Figure 4:
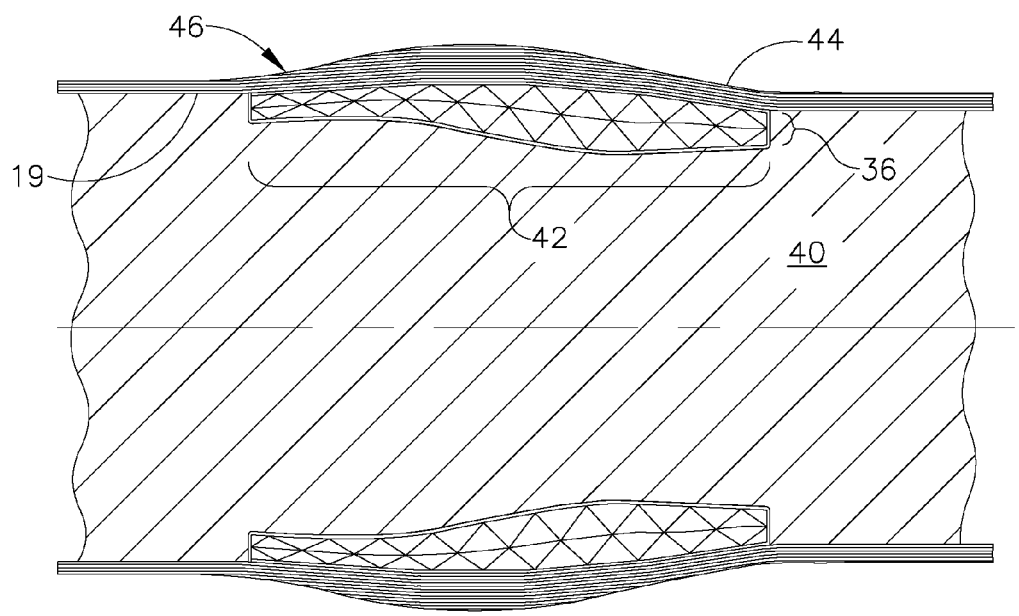
FIG. 4 is a schematic cross-sectional view of a portion of the mandrel of FIG. 3 taken along line A-A having a sandwich structure positioned in the pocket and material wrapped thereabout in accordance with description herein.

Fabrication of fan casing having integrated abradable system 35 can be accomplished in a couple of ways. In one embodiment, sandwich structure 36 having the desired number of core layers 37 may first be positioned within pocket 42 of mandrel 40, as shown in FIG. 4. Next, at least one ply of a material 44 may be continuously applied about mandrel 40 having pocket 42 containing sandwich structure 36 until the desired thickness is obtained. Similar to facesheet 33 of sandwich structure 36, material 44 may comprise any woven, braided, or non-crimp fabric capable of being infused with a resin and cured to produce a composite material. In one embodiment, the material may comprise carbon fibers, graphite fibers, glass fibers, ceramic fibers, and aramid polymer fibers. Additionally, each fiber tow may comprise from about 3000 to about 24,000 individual fiber filaments.

The resulting fan casing preform 46 having an integrated sandwich structure 36, may be treated with any suitable resin, such as epoxy, using conventional techniques for infusing the resin throughout the fan casing preform 46 and the integrated sandwich structure 36. Once the resin has been infused, fan casing preform 46 may then be cured using traditional curing methods known to those skilled in the art.

In an alternate embodiment, fan casing preform 46 can be layed up about a conventional mandrel using conventional techniques, followed by resin infusion and curing. The resulting fan casing may then have sandwich structure 36, which has been previously resin-infused and cured, bonded to interior 19 thereof. Like the previous embodiment, sandwich structure 36 can be positioned adjacent to fan blades 18 when the fan assembly of the engine is assembled, as shown in FIG. 5.

Whichever method of fabrication is selected, to complete fan casing having abradable system 35, at least one abradable layer 38 may be applied over sandwich structure 36, as shown in FIG. 5, using any suitable method, including, but not limited to, adhesively bonding or mechanically attaching. Further finishing steps conventional to all fan casing fabrication processes, such as the application of one or more acoustic panels 48, may then be carried out.

In another embodiment, the fan casing can be constructed to include an integrated fragment catcher 50 to help slow down and retain released blade fragments as the fragments are tossed about the fan casing. In this embodiment, fragment catcher 50 can be incorporated into preform 146 during the construction thereof, as explained herein below, and as shown in FIG. 6.

Figure 6:
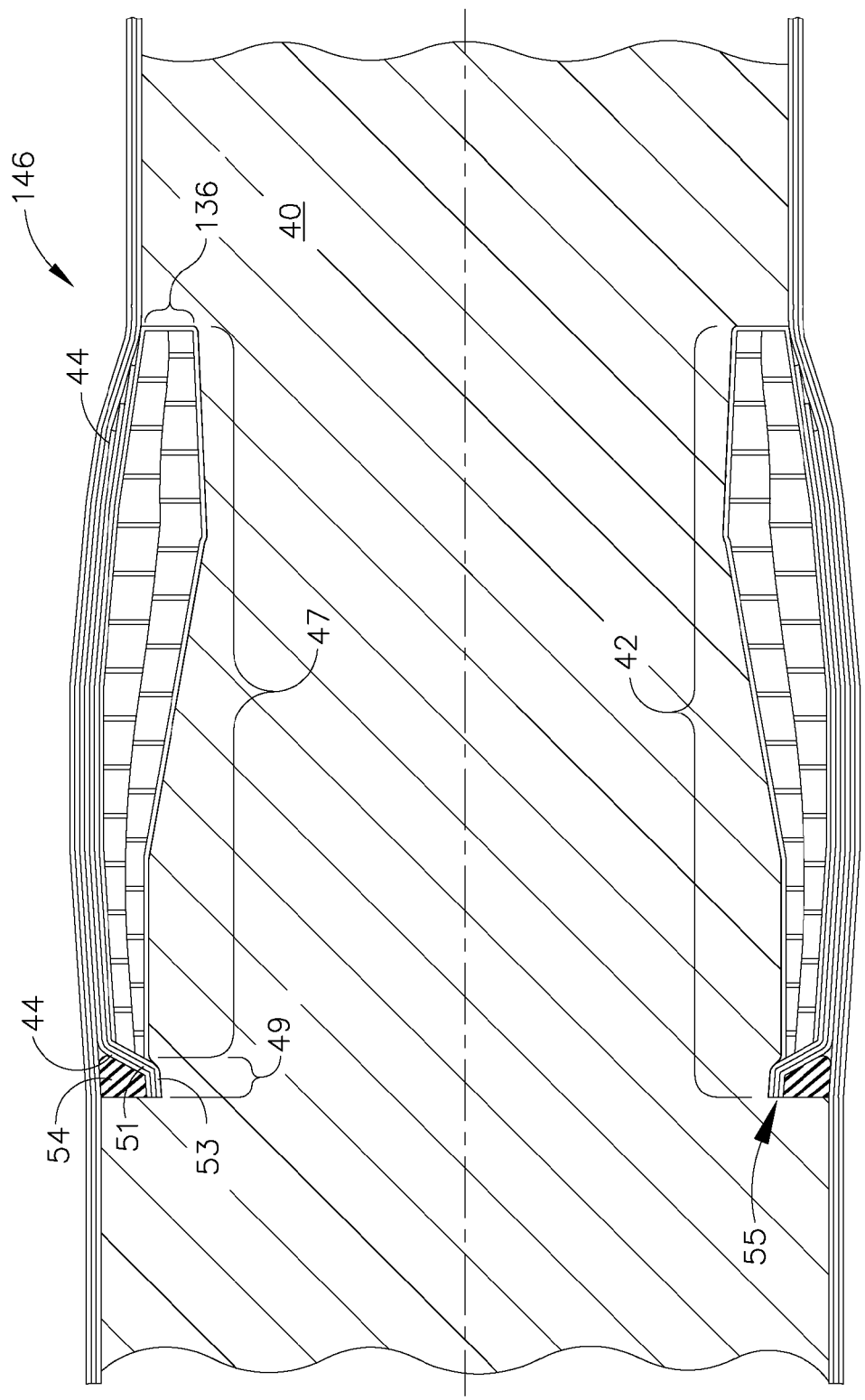
FIG. 6 is an alternate schematic cross-sectional view of a portion of the mandrel of FIG. 3 taken along line A-A having a fragment catcher and a sandwich structure positioned in the pocket and material wrapped thereabout in accordance with description herein.

Sandwich structure 136 having the desired number of core layers may be positioned within a first portion 47 of pocket 42 as shown in FIG. 6. By "first portion" it is meant the portion of the pocket occupied by the sandwich structure. In this instance, sandwich structure 136 may be shortened (as shown), or alternately, width W of pocket 42 may be extended, to account for the integrated fragment catcher preform 55. Whichever alternative is selected, sandwich structure 136 should be shaped and positioned to fit snugly against fragment catcher preform 55 so as not to interfere with the flowpath of the blade once the fan assembly is constructed. Next, at least one ply of material 44 may be continuously applied about mandrel 40 in at least the area of pocket 42 to both cover sandwich structure 136 and fabricate integrated fragment catcher preform 55, as shown in FIG. 6.

Once the desired thickness of fragment catcher preform 55 is obtained, a strip 54 can be applied about material 44 in a second portion 49 of pocket 42 to compress material 44 into the fragment catcher preform 55 shape for curing, as shown in FIG. 6. By "second portion" it is meant the portion of the pocket occupied by the fragment catcher preform, which can generally be in a forward orientation with respect to the sandwich structure. Strip 54 can comprise any suitable material capable of withstanding the curing process, such as rubber for example. Then, at least one ply of material 44 may be continuously applied about the entire mandrel 40 to build up the desired layer or layers of the fan casing preform. Those skilled in the art will understand that fragment catcher preform 55 may be fabricated from the same, or different, material 44 as the remainder of the fan casing preform.

Figure 7:
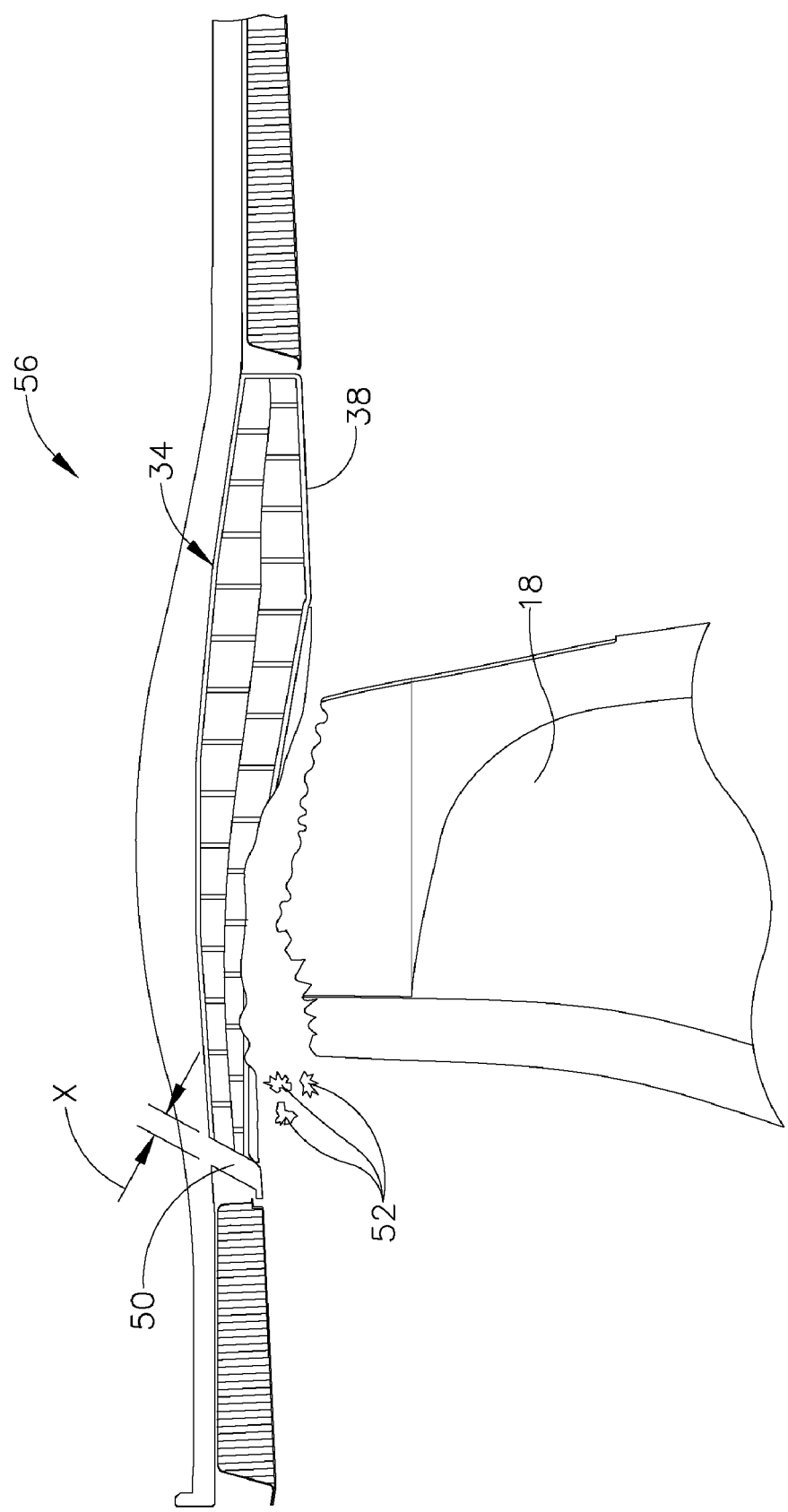
FIG. 7 is a schematic cross-sectional view of a portion of an alternate embodiment of a fan casing having an integrated fragment catcher and abradable system and the fragment catcher's position relative to released fan blade fragments in accordance with the description herein.

While the dimensions of the fragment catcher preform 55 can vary depending on need, fragment catcher preform 55 can comprise a vertical member 51 and optionally a horizontal member 53 extending from vertical member 51, as shown generally in FIGS. 6, 7, and 8. As used herein, "vertical member" 51 can be constructed to be from about 0° to about 45° from perpendicular to the fan casing and can serve to catch blade fragments from the released fan blade. As used herein, "horizontal member" 53 can be constructed to be about parallel to the fan casing and can provide addition strength to cured integrated fragment catcher 50. Moreover, the thickness and length of the vertical and horizontal members of the fragment catcher can vary depending on the size and material of construction of the fan blade. However, in one embodiment, it can beneficial for vertical member 51 and horizontal member 53 to each have a thickness X of from about 0.25 inches (about 0.63 cm) to about 0.75 inches (about 1.90 cm) after curing in order to withstand the impact of released blade fragments, as shown generally in FIG. 7.

Because fragment catcher 50 can function to help slow down and retain released blade fragments 52, fragment catcher preform 55 can be positioned in pocket 42 such that the finished fragment catcher 50 will be situated in a forward orientation with respect to sandwich structure 136 and fan blades 18 of fan casing 56 when the fan assembly of the engine is assembled, as shown in FIGS. 6 and 7. It is desirable that both fragment catcher 50 and sandwich structure 136 are flush with the flowpath of the blades 18 so as not to interfere with the revolution of the blades inside the fan casing.

In this embodiment, the resulting fan casing preform 146 may be treated with any suitable resin, and cured using traditional curing processes as previously described. Additionally, at least one abradable layer 38 may be applied to sandwich structure 136. Upon completion of the curing process, strip 54 can be removed, leaving a fan casing 56 having integrated fragment catcher 50 and integrated abradable system 34, as shown in FIG. 7. Optionally, further finishing processes may be carried out as described previously.

Those skilled in the art will understand that any composite fan casing, and not just embodiments having an integrated abradable system, can benefit from the incorporation of integrated fragment catcher 50. In such embodiments, fabrication of the fan casing can proceed as described herein except that the pocket 142 of the mandrel 140 can be accurately sized to accommodate the fragment catcher only, and the material used to fabricate the fragment catcher could be applied to at least the pocket, and in one embodiment, to the pocket and along the interior of the fan casing body, as shown generally in FIG. 8. The result is a composite containment casing preform 246 having an integrated fragment catcher preform 55.

The integrated abradable systems of the fan casing embodiment described herein can provide several benefits in addition to those previously discussed. For example, the fan casing embodiments herein can require significantly fewer layup, bonding, cure, and machining cycles than conventional fan casings due to the integrated nature and construction of the abradable system. Moreover, because the sandwich structure core layer(s) can be made from any non-metallic, composite materials, the abradable systems herein can better absorb impact energy, yet still be lightweight. In particularly, the embodiments of abradable system described herein can absorb up to about 25% of the impact energy generated by a released fan blade, leaving only about 75% of the impact energy to be absorbed by the body of the fan casing. By "impact energy," it is meant the kinetic energy of the released fan blade. This allows the thickness and, therefore, the weight, of fan casing 35 to be reduced.

In addition, the incorporation of the integral fragment catcher can provide benefits over conventional composite fan casings that lack such a feature. Unlike conventional composite fan casings, which can permit released blade fragments to escape the engine through the inlet, the addition of the fragment catcher to the present embodiments can significantly reduce the likelihood of this occurrence. The fragment catcher works by interrupting the flowpath of the released fan blade fragments, thereby deflecting the fragments. This deflection can help slow down or block the blade fragments from escaping through the engine inlet. Moreover, constructing the fragment catcher as an integral part of the fan casing can provide the strength needed for the fragment catcher to withstand the forces generated by the impact of the blade fragments.

Another benefit provided by the presently described embodiments is ease of repair. Those skilled in the art will understand that the entire abradable system need not be removed and reapplied if the damage is limited to only a portion thereof. Rather, should a portion of the abradable system become damaged by ice shedding, a fan blade out, or other like occurrence, that portion only can be replaced. Similar to fabrication, repair may be carried out in a couple of ways. In one embodiment, the damaged portion of the abradable system can be machined, or cut, out of the fan casing using conventional methods leaving a hole in the abradable system. A sandwich structure segment, which can comprise any number of core layers and facesheets as needed, may then be shaped to the proper dimensions need to fill the hole and to create a shaped sandwich structure. The shaped sandwich structure may then be positioned within the hole in the abradable system and resin may be infused therein. The fan casing having the shaped sandwich structure may then be cured to produce a fan casing having a repaired integrated abradable system.

In an alternate embodiment, the damaged portion of the abradable system can again be machined out using conventional methods to create a hole in the abradable system. A sandwich structure segment may be shaped to the proper dimensions need to fill the hole in the abradable system and to create a shaped sandwich structure. In this embodiment, the shaped sandwich structure may first be infused with resin and cured before being placed into hole and bonded to the abradable system to produce a fan casing having a repaired integrated abradable system. Those skilled in the art will understand that any acceptable adhesive or other like material may be used to bond the shaped sandwich structure in the hole on the abradable system.

Regardless of the method of repair utilized, after bonding the filler sandwich structure to the fan casing, a new abradable layer may be applied to the filler sandwich structure in the manner described previously.

The repaired fan casing having the integrated abradable system can provide all of the benefits described previously. In addition, the ability to repair only the damaged portion of the fan casing can reduce the time and expense that would otherwise be involved in replacing the entire abradable system.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A composite containment casing comprising:
a body having an interior;
a fragment catcher integrally joined to the interior of the body of the containment casing;
an abradable system integrally joined to the interior of the body of the containment casing such that the fragment catcher is positioned in a forward orientation in the containment casing with respect to the abradable system, the abradable system comprising:
a sandwich structure including:
a first facesheet and a second facesheet position about at least one core layer; and
at least one abradable layer applied to the sandwich structure;
wherein the at least one core layer comprises any of a cell configuration, a columnar configuration, or a truss configuration and wherein the sandwich structure is strong radially and weak circumferentially; and
wherein the fragment catcher comprises at least a vertical member having a thickness of from about 0.25 inches (about 0.63 cm) to about 0.75 inches (about 1.90 cm); and
wherein the fragment catcher comprises a material selected from the group consisting of carbon fibers, graphite fibers, glass fibers, ceramic fibers, aramid polymer fibers, and combinations thereof; and
wherein the sandwich structure comprises a material selected from the group consisting of carbon fibers, graphite fibers, glass fibers, ceramic fibers, aramid polymer fibers, and combinations thereof; and
wherein the fan assembly includes at least one fan blade and has a radial thickness; and wherein the abradable system is positioned adjacent to the fan blade of the fan assembly; and wherein the abradable layer comprises a low-density syntactic film epoxy.

2. The containment casing of claim 1 wherein the sandwich structure comprises a plurality of core layers.

3. The containment casing of claim 2 wherein the sandwich structure comprises a width of from about one to about three times an axial chord length of the fan blade and a depth of from about one to about five times the radial thickness of the fan casing.

* * * * *